Oct. 10, 1950 — R. B. BLACKMORE — 2,525,517
HEAD GATE AND WATER DROP ATTACHMENT
Filed May 15, 1947
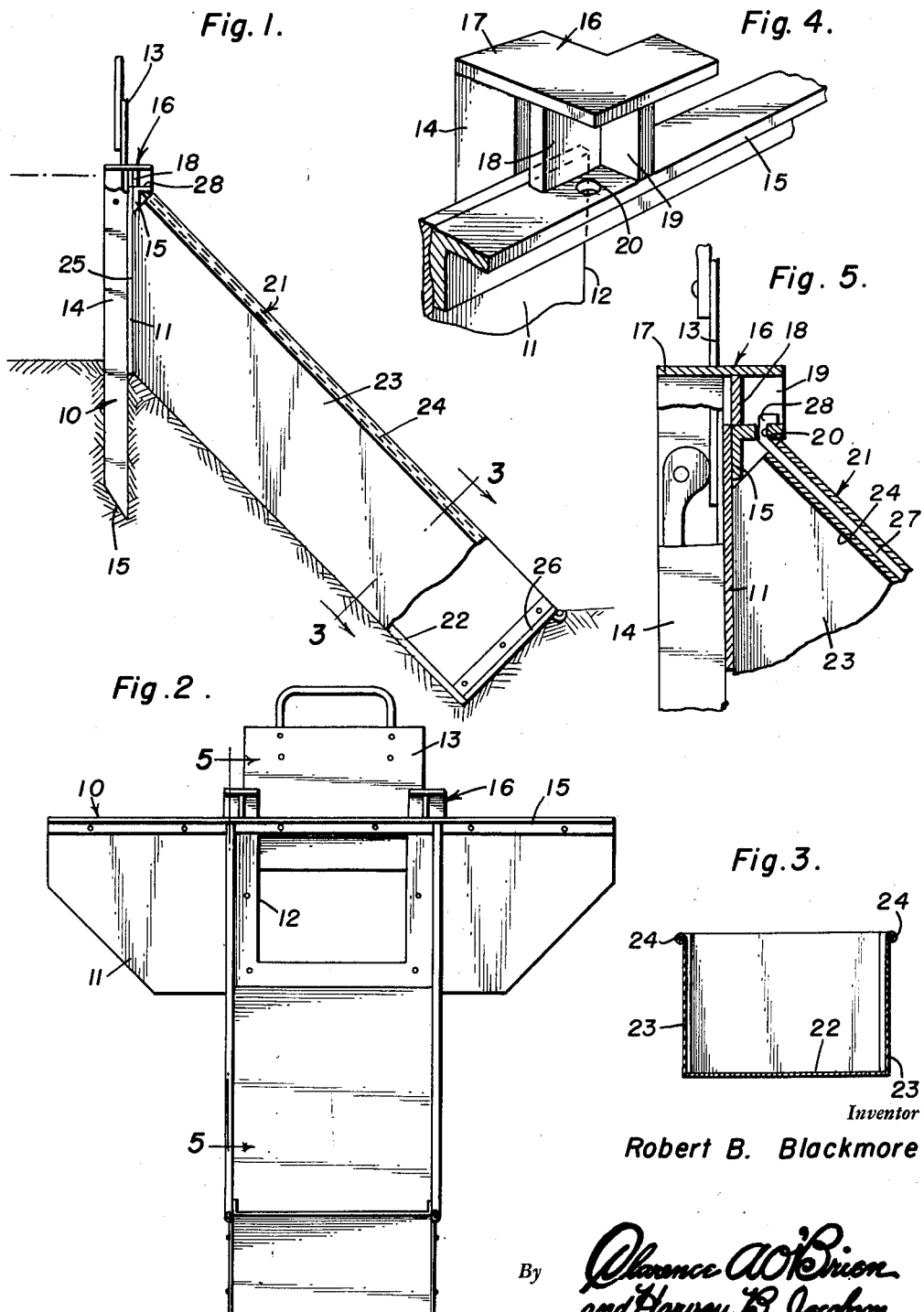
Inventor
Robert B. Blackmore
By Clarence A. O'Brien and Harvey B. Jacobson
Attorneys Patented Oct. 10, 1950

2,525,517

UNITED STATES PATENT OFFICE 2,525,517

HEAD GATE AND WATER DROP ATTACHMENT

Robert B. Blackmore, Casper, Wyo.

Application May 15, 1947, Serial No. 748,205

1 Claim. (Cl. 61—29)

This invention relates to a headgate and water drop attachment for an irrigation ditch and more particularly to a device which may be easily and quickly removed from a ditch and transported for use in another location.

The primary object of the invention is to regulate and direct the volume and flow of water through an irrigation ditch, and its discharge from a higher to a lower level.

Another object is to prevent the flowing water from eroding the soil as it flows downwardly from the headgate into a ditch at a lower level.

A still further object is to facilitate the securing of the headgate in proper location in the bed of an irrigation ditch.

The above and other objects may be attained by employing this invention which embodies among its features a headgate adapted to be introduced into an irrigation ditch, said headgate having a water passage opening through its upper edge, a gate adjustably mounted on the headgate for regulating the flow of water through the passage and a water chute detachably coupled to the headgate on the downstream side to prevent the water flowing through the gate from eroding the bed of the ditch on the downstream side thereof in the immediate vicinity of the gate.

Other features include a plate having its bottom edge shaped to conform to the general contour of an irrigation ditch, said plate having a rectangular gate opening entering its upper edge midway between its ends, an angle bar secured to the upstream side of the plate adjacent each side edge of the gate opening, each angle bar extending beyond the bottom edge of the plate to form anchors adapted to be driven into the bed of an irrigation ditch, a reinforcing angle bar attached to the downstream side of the plate adjacent its upper edge and extending across the gate opening in spaced parallel relation with the bottom edge thereof, the flange of said last named angle bar which lies perpendicular to the plate projecting toward the downstream side of the headgate and having a hook receiving opening extending therethrough adjacent the upper end of each first mentioned angle bar, a gate mounted to slide vertically between the perpendicular flanges of the first mentioned angle bars to regulate the size of the opening in the plate, a driving cap on the reinforcing angle bar in vertical alignment with each of the first mentioned angle bars, a trough shaped water drop having parallel side walls, a hook at one end of each side wall of the trough adjacent the side remote from the bottom of the trough, said hooks entering the openings in the reinforcing angle bar to couple the trough to the gate and an end wall closing the end of the trough remote from the headgate.

In the drawings:

Figure 1 is a side view of a headgate and water chute embodying the features of this invention, certain portion of the chute being broken away more clearly to illustrate the details of construction;

Figure 2 is an end view of the headgate illustrated in Figure 1;

Figure 3 is a transverse sectional view taken substantially on the line 3—3 of Figure 1;

Figure 4 is a fragmentary perspective view showing a driving cap in detail, and;

Figure 5 is an enlarged fragmentary sectional view taken substantially on the line 5—5 of Figure 2.

Referring to the drawings in detail a headgate designated generally 10 comprises a plate 11, the bottom edge of which is shaped to conform to the general contour of an irrigation ditch. Entering the upper edge of the plate 11 substantially midway between the opposite ends thereof and extending to a plane near the lower edge of the plate 11 is a gate opening 12 which is adapted to be closed, or partially closed by a suitable gate 13 mounted to slide vertically with relation to the plate 11 in any conventional manner. It will be understood that the plate 13 will regulate the size of the opening 12 and may be held in any desired position with relation to the opening 12 by any suitable catch.

Extending in spaced parallel relation on opposite sides of the openings 12, on one face of the plate 11 are spaced parallel angle bars 14, the lower ends of which project well beyond the lower end edge of the plate 11 and are sharpened as at 15 to facilitate their being driven into the bed of the ditch in which the gate is to be employed. In the preferred form of the invention the flanges of the angle bars which lie against the plate 11 project toward one another and lie in planes with the side edges of the opening 12, with the flanges thereof opposite those which lie against the plate 11, extend perpendicular to the plate. These angle bars 14 are welded, riveted or otherwise rigidly fixed to the plate 11, and the unit thus formed may be employed as a headgate in an irrigation ditch. Riveted or otherwise secured to the upper edge of the plate 11 and extending transversely across the upper end of the opening 12 is a reinforcing angle bar 15, one flange of which lies against the plate 11 while the opposite flange projects perpendicularly from the plate in a direction opposite the flanges of the angle bars 14, and in a plane coincident with the upper edge of the plate 11. It will thus be seen that the plate will be properly reinforced and held against deformation when in transit or use.

In order to facilitate the setting of the headgate in proper position within an irrigation ditch I provide driving caps designated generally 16 each of which comprises an L-shaped body 17 carrying on one face a flange 18 which is adapted to rest on the upper edge of the angle bar 15 immediately adjacent the plate 11. Extending perpendicularly from the flange 18, midway between opposite ends and to a point coincident with the edge of the body 17 opposite the flange, is a web 19. As illustrated in the drawings the upper ends of the bars 14 project beyond the upper edge of the plate 11 and seated on the upper ends of the angle bars are the portions of the plates 17 opposite those carrying the webs 19, while the web 19 of each driving cap is seated on the perpendicular flange of the reinforcing angle bar 15. These driving caps are preferably welded in place as illustrated in the drawings so that in positioning the headgate in an irrigation ditch, blows directed onto the driving cap will be transmitted directly to the angle bars 14 in order to force the sharpened ends 15 thereof into the bed of the ditch. Formed in the reinforcing bar in planes substantially aligning with the longitudinal axes of the angle bars 14 are openings 20 the purpose of which will be more fully hereinafter explained.

In order to direct the water flowing through the gate into the proper direction, and to prevent erosion of the bottom of the irrigation ditch on the downstream side of the gate I provide a water drop or chute designated generally 21 which comprises a bottom 22 carrying at opposite side edges perpendicular side walls 23, the longitudinal edges of which opposite those joining the bottom are rolled as at 24 to form stiffening reinforcements which will serve to hold the chute in proper position. As illustrated in Figure 1 the side walls 23 of the chute 21 are cut away or beveled as at 25 to engage against the downstream face of the plate 11 so that water flowing through the headgate will be restrained from lateral discharge. An end wall 26 extends transversely across the end of the chute 21 opposite the beveled ends 25, and contained within the rolled edges 24 of the side walls 23 are rods 27 which are provided, adjacent the beveled ends 25 of the side walls 23, with hooks 28 which as illustrated in Figure 5 are adapted to enter the openings 20 in the reinforcing angle bar 15 in order detachably to couple the chute to the gate.

In use it will be understood that the headgate 10 is transported to the point at which it is to be introduced into a ditch and the pointed ends 15 of the angle bars 14 are seated against the bottom or bed of the ditch, after which the gate is driven into place by successive blows on the driving caps 16. When the gate has been properly seated in the ditch, the chute 21 is connected thereto by entering the hooks 28 into the openings 20 so that water flowing through the opening 12 in the plate 11 will be directed downwardly into the bed of a ditch in a lower level. Owing to the fact that the water contacts the bottom 22 of the chute it will be evident that the bed of the lower ditch in the immediate vicinity of the headgate 10 will be preserved, and no erosion thereof will occur. Likewise the upper edge of the end wall 26 of the chute 21 is disposed at the level of the bed of the ditch on the downstream side of the gate, so that the water discharged from the chute will have no tendency to erode the bed of the ditch into which the water is being discharged. In this way the relative positions of the beds of the upper and lower ditches may be preserved and the erosive action on the ditch beds, due to the fall of the water, will be avoided.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In an irrigation ditch headgate of the type which includes a plate having its bottom edge shaped to conform to the general contour of an irrigation ditch, said plate having a rectangular gate opening entering its upper edge midway between its ends, a reinforcing angle bar attached to the downstream side of the plate adjacent its upper edge and extending across the gate opening in spaced parallel relation to the bottom edge thereof, the flange of said last named angle bar which lies perpendicular to the plate projecting toward the downstream side of the headgate and having a hook receiving opening extending therethrough adjacent each upper corner of the opening in the headgate, a water drop attachment for said headgate comprising a trough having parallel side walls, a hook at one end of each side wall of the trough for entering the openings in the reinforcing angle bar of the headgate and coupling the trough to the gate, an end wall closing the end of the trough remote from the headgate, said end wall being designed to extend downwardly into the bed of an irrigation ditch with its upper end lying substantially level with the bed of the ditch whereby water discharged from the trough will be delivered substantially parallel with the bed of the ditch.

ROBERT B. BLACKMORE.

REFERENCES CITED

The following references are of record in the file of this patent:

UNITED STATES PATENTS

| Number | Name | Date |
|---|---|---|
| 1,161,997 | Thompson | Nov. 30, 1915 |
| 1,378,342 | Freudenberg | May 17, 1921 |
| 1,579,288 | Edwards | Apr. 6, 1926 |
| 1,768,120 | Crill | June 24, 1930 |
| 1,901,956 | Gilbert | Mar. 21, 1933 |
| 2,415,332 | Blackmore | Feb. 4, 1947 |

FOREIGN PATENTS

| Number | Country | Date |
|---|---|---|
| 276,115 | Germany | 1914 |